(12) United States Patent
Fröberg Olsson et al.

(10) Patent No.: US 10,536,246 B2
(45) Date of Patent: Jan. 14, 2020

(54) DYNAMIC DEMODULATION INDICATION

(71) Applicant: Telefonaktiebolaget LM Ericsson (publ), Stockholm (SE)

(72) Inventors: Jonas Fröberg Olsson, Ljungsbro (SE); Pål Frenger, Linköping (SE); Martin Hessler, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 187 days.

(21) Appl. No.: 15/541,855

(22) PCT Filed: Mar. 8, 2017

(86) PCT No.: PCT/EP2017/055418
§ 371 (c)(1),
(2) Date: Jul. 6, 2017

(87) PCT Pub. No.: WO2017/162438
PCT Pub. Date: Sep. 28, 2017

(65) Prior Publication Data
US 2018/0054284 A1    Feb. 22, 2018

Related U.S. Application Data

(60) Provisional application No. 62/311,497, filed on Mar. 22, 2016.

(51) Int. Cl.
*H04L 5/00* (2006.01)
*H04L 5/14* (2006.01)
*H04W 72/04* (2009.01)

(52) U.S. Cl.
CPC .......... *H04L 5/0046* (2013.01); *H04L 5/0007* (2013.01); *H04L 5/0044* (2013.01);
(Continued)

(58) Field of Classification Search
CPC ....... H04L 5/14; H04L 5/0046; H04L 5/0007; H04L 5/0044; H04L 5/0092;
(Continued)

(56) References Cited

U.S. PATENT DOCUMENTS

| 2014/0050191 A1* | 2/2014 | Kim ................. H04L 5/001 370/329 |
| 2014/0119335 A1* | 5/2014 | Wang ................. H04W 72/042 370/330 |
| 2019/0223204 A1 | 7/2019 | Kim et al. |

FOREIGN PATENT DOCUMENTS

| WO | 2017065666 A1 | 4/2017 |
| WO | 2017078373 A1 | 5/2017 |

OTHER PUBLICATIONS

3rd Generation Partnership Project, "Technical Specification Group Radio Access Network; Evolved Universal Terrestrial Radio Access (E-UTRA); Physical channels and modulation (Release 13)", 3GPP TS 36.211 V13.0.0, Dec. 2015, pp. 1-141.
(Continued)

*Primary Examiner* — Kyaw Z Soe
(74) *Attorney, Agent, or Firm* — Sage Patent Group

(57) ABSTRACT

The present invention relates to an improved applying of dynamic demodulation for a first physical channel (rPDCH) of a radio access of a terminal device (10) to a base station (30) of a wireless communication network. The improved dynamic demodulation is achieved by obtaining (S110), at the terminal device, a demodulation indicator, DI, said DI indicating a usage of configured resources of a second physical channel (PDCCH) for demodulating a part or all of the first physical channel (rPDCH); and by demodulating (S130), at the terminal device, data received on the first physical channel (rPDCH) based on the DI.

30 Claims, 7 Drawing Sheets

(52) U.S. Cl.
CPC .......... *H04L 5/0053* (2013.01); *H04L 5/0092* (2013.01); *H04L 5/1469* (2013.01); *H04W 72/042* (2013.01); *H04L 5/0048* (2013.01); *H04W 72/0446* (2013.01)

(58) Field of Classification Search
CPC .... H04L 5/1469; H04L 5/0053; H04W 72/04; H04W 72/042
See application file for complete search history.

(56) References Cited

OTHER PUBLICATIONS

Office Action dated Oct. 17, 2019 for European Patent Application No. 17710855.2, 8 pages.

* cited by examiner

DYNAMIC DEMODULATION INDICATION

TECHNICAL FIELD

The present invention generally relates to wireless communications, and particularly relates a method, a terminal device, a base station, a computer-readable storage medium, a computer program, and a carrier containing the computer program for use of configured resources of a second physical channel for demodulating data received on a first physical channel, more particularly, the use of configured resources based on a dynamic demodulation indication.

BACKGROUND

In wireless communication networks information about the format in which the data is communicated between network nodes, such as between a terminal device (which is a wireless terminal device, being mobile or fixed, e.g. a UE in a LTE network) and a base station (such as a eNB), is transmitted as control information in a specified and known way.

The $3^{rd}$-Generation Partnership Project (3GPP) has developed standards for a fourth-generation wireless communications technology referred to as "Long Term Evolution" (LTE) or, more formally, the Evolved Universal Terrestrial Radio Access Network (E-UTRAN). In an LTE network, the Physical Downlink Control Channel (PDCCH) and the Enhanced Physical Downlink Control Channel (ePDCCH) are physical downlink control channels used to send downlink and uplink grants, which are specifications indicating to the UE, respectively, how transmissions to the UE on the Physical Downlink Shared Channel (PDSCH) are formatted and how transmissions from the UE on the Physical Uplink Shared Channel (PUSCH) should be formatted. On PDSCH and PUSCH, both control data and user data are multiplexed by the Medium Access Control (MAC) layer, and thus these physical data channels may be understood to carry Layer 2 messages. However, some uplink control messages (i.e., uplink control information, or UCI), such as downlink hybrid automatic repeat request (HARQ) feedback and channel state information (CSI) reports, are either sent on the Physical Uplink Control Channel (PUCCH) or are multiplexed by the physical layer on the PUSCH resource, in which case the PUSCH is rate matched around the UCI. The terminal device (UE) first decodes the control information (grant) that contains information on the transport format of the transmitted (downlink) data or the data to be transmitted (uplink).

In LTE networks, for example, the grant is transmitted on PDCCH or ePDCCH, as explained above, using a variety of DCI formats which are specific to different operating modes of the terminal device (UE). The size of the PDCCH can dynamically be adopted using an indicator transmitted on PCFICH which is read by UEs to determine in which symbol the control channel (PHCCH) ends and the data channel PDSCH starts. Hence, the PCFICH provides a configuration of the PDCCH, i.e. where to find the PCCH, In case the ePDCCH is used, then the control region for providing DCI is pre-configured and the UE perform a rate-matching, i.e. an adjustment of the coding rate, for example by taking into account, e.g., channel quality and available resource elements, around the ePDCCH if it detects a grant on the ePDCCH. This means that resource elements used by any ePDCCH (present or not present) on the resource pre-configured for ePDCCH are not used for PDSCH.

SUMMARY OF THE PRESENT INVENTION

Problems with Existing Solutions

Future radio access technologies are expected to support a lot more transmit antennas, and especially then on the network side. In the context of massive MIMO, for example, the number of antennas is expected to be huge and a single transmission point (such as a radio base station, eNB) could have in the order of several hundreds or even thousands of antenna elements. A large (albeit much smaller) number of antennas could potentially be expected also in the terminal device when using the higher carrier frequencies, since the physical size of the antenna elements at those frequencies can be made very small.

This increased number of antenna elements makes it possible to form more directive antenna signal patterns as compared to what is possible with the older antenna systems of today. The more capable systems can thus focus their transmitted and/or received signal much more efficiently in a direction towards the terminal device (which may be a wireless terminal device, being mobile or fixed, e.g, a UE in a LTE network being served, whilst suppressing the interference from/to other UEs. Each such direction is typically referred to as a "beam", whereas the entire process is referred to as "beam-forming".

The PDCCH in LTE (3GPP TS 36.211 V.13.0.0) does not support UE-specific beamforming as a consequence that demodulation of PDCCH relies on cell-specific reference signals and that makes it unsuitable for massive MIMO. Furthermore the PDCCH spans the whole system bandwidth and this makes it difficult to support narrow band terminals (such as low cost MTC devices).

The ePDCCH (3GPP TS 36.211 V.13.0.0) partly solves these shortcomings by using dedicated (i.e. the ePDCCH has its own reference signals for demodulation) instead of cell-specific reference signals and by supporting frequency multiplexing of control and data channels. This means that the ePDCCH can, in principle, be UE-specifically beam-formed. But doing so would waste radio resources since the ePDCCH is, by design, a shared control channel. In case there are many terminal devices (UEs) utilizing ePDCCH control signaling then each terminal device (UE) might need its own control region and DMRS for receiving a UE specifically beam-formed ePDCCH and that would be unnecessarily costly. Alternative the ePDCCH could be beam-formed to the group of UEs being scheduled, but this would make things more complicated to the scheduler that would need to maintain group-specific beamforming of the ePDCCH and UE-specific beam-forming of the PDCCH.

For the 5G radio access technology, referred to as NX in the following, there are also new requirements that need to be addressed and the ePDCCH design should be further improved upon. For example, the support for HARQ feedback should be very fast. More specifically the ePDCCH spans over the entire downlink TTI which makes very fast decoding and HARQ feedback difficult. In other words, with an ePDCCH the UE has to wait the whole sub-frame until it can start decoding data. The data decoding cannot start until the DCI is received and the support of time (latency time) critical MTC applications with NX will probably not be fast enough.

A new set of control channels for NX should support UE-specific beamforming (like the ePDCCH does, but just not very efficiently). In order to enable fast decoding and feedback the DCI need to come early in the TTI (like when using the PDCCH). To support both the need of sending control data with and without UE-specific beamforming NX is expected to support a PDCCH control channel similar to the LTE PDCCH as well as an in-hand control and data channel herein referred to as a dPDCH (direct Physical Data Channel). The PDCCH in NX will differ from the PDCCH in LTE in that it will use DMRS instead of CRS which is used in LTE. Therefore, the PDCCH in NX may also be beam-formed, in comparison to PDCCH in LTE, but typically only to a group of UEs that need to receive the PDCCH.

The in-band control and data channel (dPDCH) is denoted a "direct" channel instead of a "control" channel since it may, in some scenarios, be used also for communication of time-critical and/or error sensitive user-plane data. The dPDCH will be accompanied by a "re-transmittable" channel (rPDCH). The reason for denoting this channel "re-transmittable" and not simply as a "data" channel is that in some use-cases control information is less delay critical than user-plane data. In a typical mobile broadband use-case the dPDCH is used for control information and the rPDCH is used for communication of user-plane data, while in time-critical or other scenarios the dPDCH is used for user-plane data and the rPDCH is used for control information.

As such, there are two new physical data channels, dPDCH and rPDCH. Here, dPDCH is a direct channel for non-re-transmittable data, and for which decoding-related information is not retained by the receiving node (terminal device) in the event of an unsuccessful decoding of the data. On the other hand, rPDCH is a "re-transmittable" channel for re-transmittable data, i.e., data that will be retransmitted in the event that a negative acknowledgement is received by the transmitting node (base station) (or, in some cases, in the event that an acknowledgement is not received), and for which decoding-related information may be retained by the receiving node (terminal device) in the event of an unsuccessful decoding of the data, for use in combining with decoding-related information obtained when decoding the corresponding retransmitted data. This addresses the situation that for some time-critical application data there is no use of providing a conventional HARQ process, since data arrival after a re-transmission would be too late for such applications and the HARQ feedback would only provide un-necessary overhead.

To benefit as much as possible from beamforming gains the control information is expected to be sent over dPDCH as much as possible. Hence, the PDCCH will only be used as bootstrap channel before knowing how to beam-form to the UE and as a fallback if beamforming to the UE for some reason fails. It is noted that the PDCCH does not necessarily have to span the whole bandwidth. The bandwidth of the PDCCH is configurable in order to support narrow band terminal devices (including MTC devices) and also to enable power-boosting for enhanced coverage when we cannot perform UE specific beam-forming. The PDCCH also uses DMRS which makes it possible to beam-form it to a group of terminal devices (UEs) or to a single terminal device (UE) (which would be less efficient than using the dPDCH since the PDCCH uses a separate DMRS).

A possible TDD frame structure for NX having respective OFDM symbols is illustrated in FIG. 1. Here, the rPDCH is located in the OFDM symbols 4-12 and is, as explained above, a re-transmittable channel (primarily designed for user-plane data) and the HARQ feedback for rPDCH transmissions are transmitted on the uplink dPDCH or on the PUCCH (Physical Uplink Control Channel) which is located in the last OFDM symbol. In one embodiment, the uplink control information in NX may have a special physical channel. In another embodiment, a direct and a re-transmittable channel rather than a control and data channel is also applied to the uplink. Here we denote the channel that carries uplink control information as PUCCH although the terminology uplink dPDCH would also be possible. The main reason for this is that with this notation dPDCH is always a downlink channel and PUCCH is always an uplink channel and we don't need to denote the channels as downlink dPDCH and uplink dPDCH each time we refer to it.

Further, one OFDM symbol long DL/UL switch guard period is indicated by "DL/UL switch" in FIG. 1. As illustrated in FIG. 1, the PDCCH is located in the first OFDM symbol and may cover only a part of the frequency band, as shown in FIG. 2 (shaded region in the first OFDM symbol in Subframe N) which illustrates two subframes N and N+1 of the TDD frame structure and where rPDCH is rate-matched around PDCCH in both subframes N and N+1, i.e. frequency resources are used that are not occupied by PDCCH, It is, however, noted that the PDCCH is not present in subframe N+1. Such a frame structure therefore corresponds to un-used resources since the PDCCH is not present.

Further, "PDCCH DMRS+PDCCH" in FIG. 1 means that the OFDM resource indicated is used (or partly used) by both the DMRS for PDCCH and the PDCCH itself. Also the dPDCH may cover only a fractional part of the frequency band (in OFDM symbol three, see FIG. 2). Here, the "PDCH DMRS" in the second symbol are used to demodulate the dPDCH in third symbol and the rPDCH. Accordingly, a terminal device (UE) will blindly and therefore inefficiently search for grants on PDCCH (first OFDM symbol) and dPDCH (third OFDM symbol). If the terminal device (UE) detects a grant on dPDCH it will rate-match rPDCH around PDCCH since the PDCCH may be used to transmit grants to other terminal devices (UEs) as illustrated in FIG. 2. More specifically, for subframe N in FIG. 2, the PDCCH is used in the first OFDM symbol, while in Subframe N+1 there is no PDCCH which means that resources are wasted. It is further noted that rate-matching here is around the whole PDCCH resource, not only the PDCCH received by the terminal device (UE). In particular, the PDCCH resource may comprise several PDCCHs where one DCI is transmitted over each PDCCH. The same terminology is typically adopted for ePDCCH. A ePDCCH resource coincides with a ePDCCH set where typically several ePDDCHs can be sent. If a terminal device (UE) receives a DCI over a ePDCCH in a ePDCCH set, then the terminal device (UE) rate-match around that ePDCCH set.

As such, there is a need to solve the problem of dynamically unused resources when the direct physical channel (dPDCH) and re-transmittable physical channel (rPDCH) are both mapped onto a frame in which the PDCCH may or may not be present as well. There is also a need to provide a faster finding and hence decoding of the direct physical channel (dPDCH) which is of importance for data transmissions that should arrive at the terminal device with low latency and possibly with low error rate.

SUMMARY OF THE PRESENT INVENTION (SOLUTION)

Accordingly, it is an object of the present invention to solve the above described problems. In particular, it is an object of the present invention to overcome the above-described limitations that result from the dynamically unused resources.

Suitable methods, a base station (network node), a terminal device, a computer-readable storage medium, a computer program, and a carrier containing the computer program for providing and using a demodulation indication are defined in the independent claims. Advantageous embodiments are defined by the dependent claims.

In one embodiment, a method is defined for applying demodulation for a first physical channel of a radio access of a terminal device to a base station of a wireless communication network, which comprises the steps of: obtaining, at the terminal device, a demodulation indicator, DI, said DI indicating a usage of configured resources of a second physical channel for demodulating a part or all of the first physical channel; and demodulating, at the terminal device, data received on the first physical channel based on the DI.

In a further embodiment, a method is defined for providing a demodulation indication for a first physical channel of a radio access of a terminal device to a base station of a wireless communication network, which comprises the steps of: determining, at the base station, a demodulation indicator, DI, said DI indicating a usage of configured resources of a second physical channel for demodulating a part or all of the first physical channel; and transmitting said DI to the terminal device.

In another embodiment, a base station (network node) and a terminal device are respectively defined which are adapted to perform the above methods. In still further embodiments, a corresponding computer-readable storage medium, computer program, and carrier containing the computer program are defined.

BRIEF DESCRIPTION OF THE DRAWINGS

The embodiments herein will now be further described in more detail in the following detailed description by reference to the appended drawings illustrating the embodiments and in which.

DETAILED DESCRIPTION

In the following, embodiments are described with reference to the appended Figures. It is noted that the following description contains examples only and should not be construed as limiting the invention. A person skilled in the art will recognize additional features and advantages upon reading the following detailed description. Further, similar or same reference signs indicate similar or same elements or operations.

Embodiments of the present invention address the above described problem of dynamically unused resources when the direct physical channel (dPDCH) and re-transmittable physical channel (rPDCH) are both mapped onto a frame in which the PDCCH may or may not be present as well. Embodiments of the present invention also address the above described problem of faster finding and hence decoding of the direct physical channel (dPDCH) which is of importance for data transmissions that should arrive at the terminal device with low latency and possibly with low error rate.

Aspects of the present invention, as explained in further detail below, include processes/methods and devices for demodulating data received on the first physical channel (rPDCH) by using configured resources of a second physical channel (PDCCH), in other words for applying a dynamic demodulation for a first physical channel, i.e. the re-transmittable physical channel rPDCH, of a radio access of a terminal device to a base station of a wireless communication network. Here, the second channel may be a pure control channel. This concept of the present invention may be based on the introduction of a dynamic signaling to the terminal device (such as a UE) if and how rPDCH is mapped onto the PDCCH physical resources. Here, the terminal device may be a mobile or a fixed terminal device. The terminal device is a wireless terminal device, and may be a (fixed or mobile) user device (UE) or a MTC device, for example a "self-driving car", capable of having a radio access to a base station. Further, the base station is a network node of a wireless communication network, in particular a radio access node for providing a radio access to the terminal device, and also has kind of coverage area (including based on the beam-forming process, as described above) in which it may provide the radio access. Such a radio access may be of any spectrum or standard (GSM, GPRS, 3G, 4G, LTE, 5G, NX, WiFi, even DECT, etc.).

Figure 3:
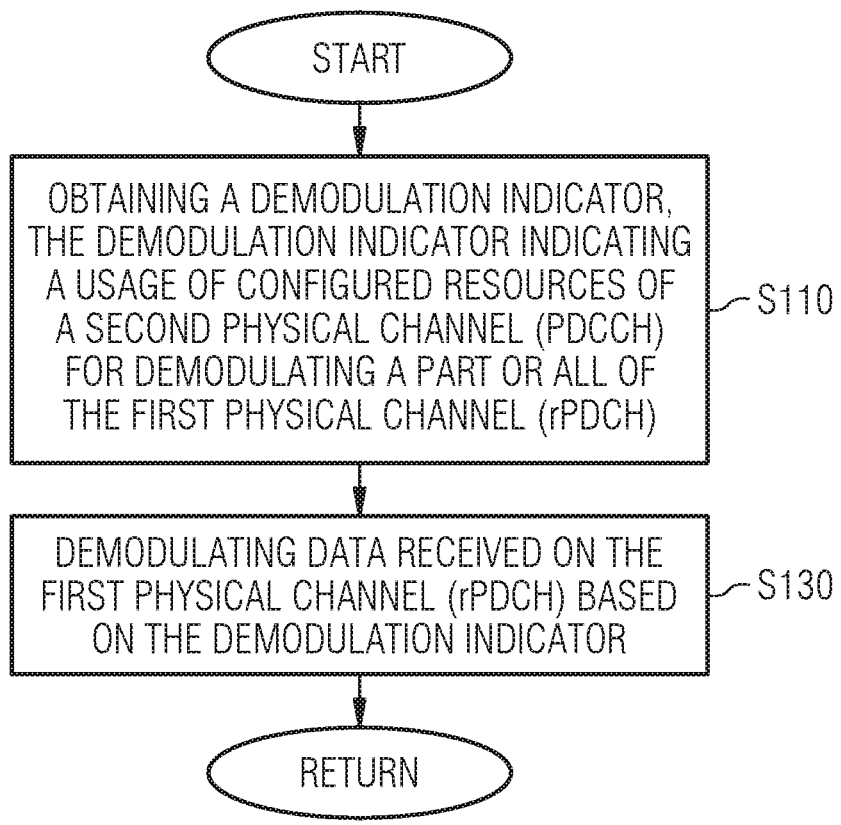
FIG. 3 is a schematic flow diagram illustrating an embodiment of a method for applying dynamic demodulation.
Figure 4:
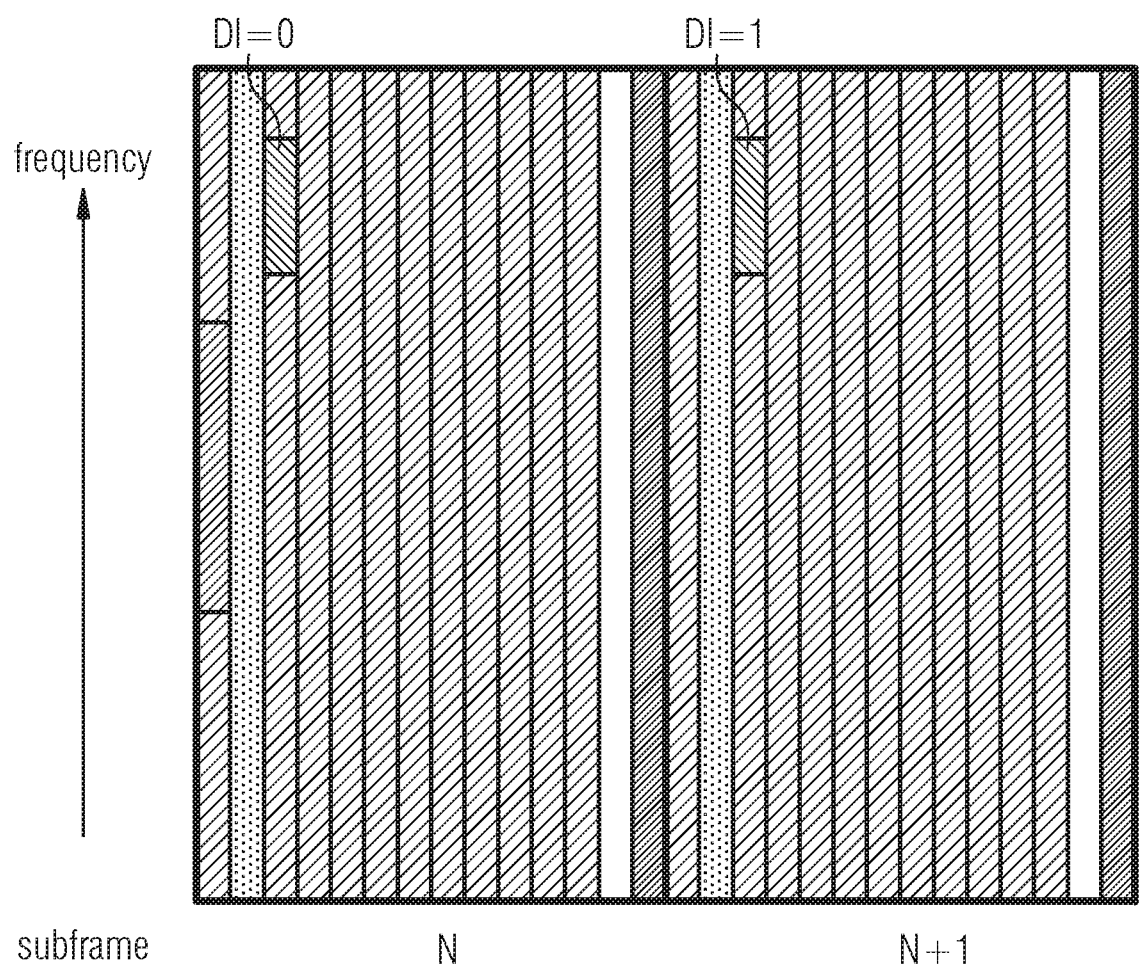
FIG. 4 is a schematic diagram illustrating an embodiment according to subsequent subframes N and N+1 including a respective demodulation indicator to indicate rate-matching or no rate-matching around PDCCH resources.

FIG. 3 illustrates an embodiment of a method for applying a dynamic demodulation for the first physical channel at the terminal device side. According the step S110 of FIG. 3 the terminal device 10 obtains a demodulation indicator (which is also referred to as "DI" in the following). This DI indicates a usage of configured resources of a second physical channel, i.e. PDCCH, for demodulating a part or all of the rPDCH. In other words, while radio resources may be configured to be used by the PDCCH, e.g. a part or all resources of an OFDM symbol in a TDD subframe, the PDCCH may actually be present or may not be present and this is indicated by the DI. That is, the configured resources may or may not be used by the PDCCH and this may change dynamically, e.g. from subframe to subframe. Further, the DI may have different values for different terminal devices (UEs), i.e. the DI may be terminal device specific. FIG. 4 (which will be described in detail below) illustrates an embodiment in which scheduled resources for the PDCCH are used in a part of the first symbol of subframe N (shaded region), but are not used for the PDCCH in the subsequent subframe N+1. The DI therefore provides an indication as to whether the configured resources are actually used by the PDCCH and whether a part or all of the configured resources for the PDCCH should be used for demodulating the rPDCH. Again referring to FIG. 3, the DI may be received at the terminal device 10 on the third physical channel, i.e. dPDCH, here in the third symbol of subframe N and N+1, and indicates whether the configured resources are used by the PDCCH (DI=0 in subframe N) or are not used by the PDCCH (DI=1 in subframe N+1). Based on this DI, a part or all configured resources for the PDCCH (e.g. in symbol 1 of subframe N+1) is used for demodulating data received on the rPDCH according to step S130 of FIG. 3, and thus overcoming the problem of dynamical unused resources. Furthermore, based on this DI, when the scheduled resources are actually used by the PDCCH (e.g. shaded region in symbol 1 of subframe N), then the rPDCH will be demodulated by rate-matching around the configured PDCCH resources, or by again using a part or all configured resources for the PDCCH but when a power offset is applied for the rPDCH in the configured PDCCH resources, as will be explained below.

Figure 5:
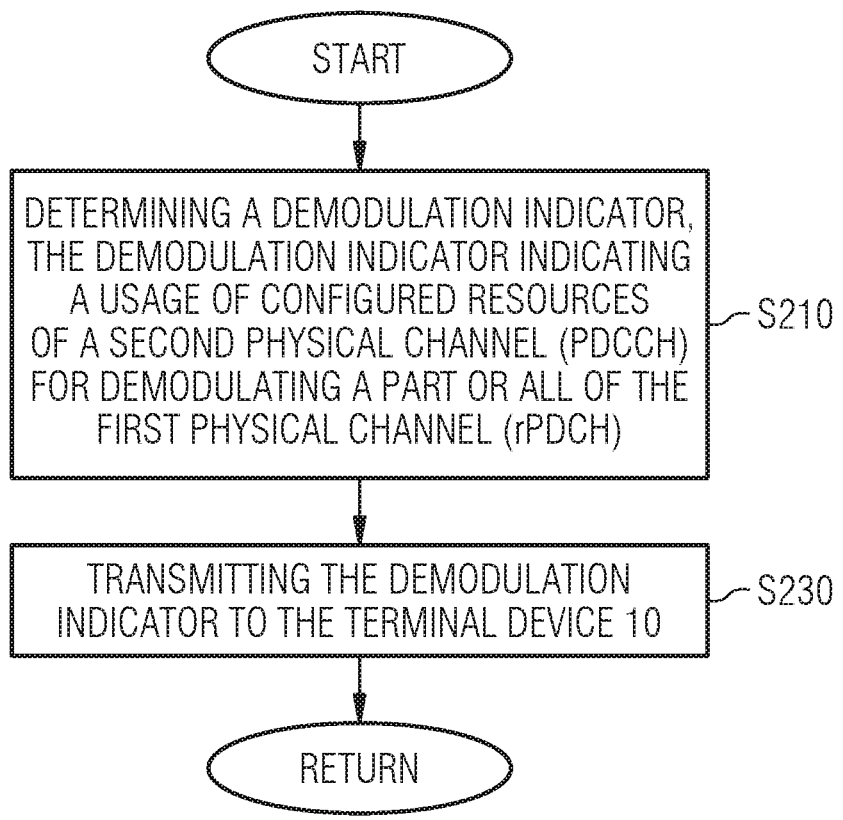
FIG. 5 is a schematic flow diagram illustrating an embodiment of a method for determining a dynamic demodulation indicator.

FIG. 5 illustrates an embodiment of a method for providing a dynamic demodulation indication for the first physical channel at the base station side. According to step S210, the base station 30 determines the above and below described DI, and transmits the determined DI in step S230 to the terminal device 10, for example using the third physical channel (dPDCH). Here, the determination step may be performed at the base station 30 by taking into account presence or non-presence of re-transmittable and non-re-transmittable data, the presence of critical MTC data transmissions (e.g. $10^{-4}$-$10^{-9}$ BLER), the presence of critical control messages (e.g. $10^{-2}$-$10^{-4}$ BLER), rule(s) of mapping the re-transmittable and non-re-transmittable data onto the rPDCH and dPDCH, and the like. In some embodiments the terminal device (UE) is configured with a sub-frame-dependent DI. For example, even sub-frames are associated with a DI indicating that configured resources for second physical channel is not used by first physical channel, while odd sub-frames are associated with a DI indicating that configured resources for second physical channel is used by first physical channel if the assignment of first physical channel was received on a third physical channel.

Figure 6:
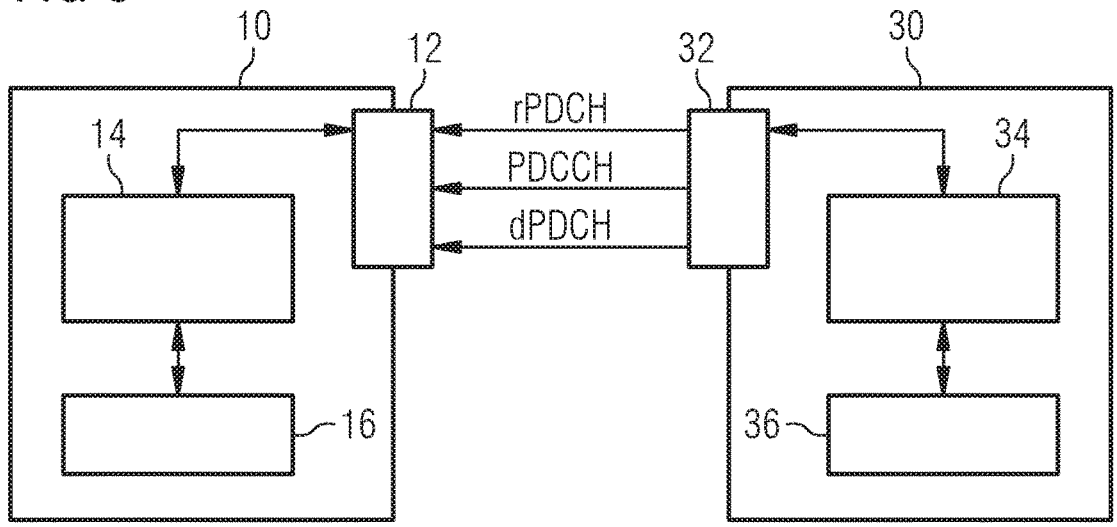
FIG. 6 is a schematic diagram illustrating a terminal device 10 and a base station 30 according to an embodiment.

FIG. 6 illustrates a diagram of a terminal device 10 and a base station (network node) 30 which may be configured to carry out one or more of the above-described and below described techniques. The terminal device 10 is provided with a radio transceiver module 12 that provides an air interface to the corresponding radio transceiver module 32 of the base station (network node) 30. The radio transceiver modules 12 and 34 may respectively include transmitter circuits, receiver circuits, and associated control circuits that are collectively configured to transmit and receive signals and messages according to a radio access technology, specifically here with regard to the rPDCH, dPDCH, and PDCCH, but not limited to these channels.

As illustrated in FIG. 6 the terminal device 10 and the base station (network node) 30 further comprise a processing module 14 and 34, respectively, that are configured to control the radio transceiver module 12 and the radio transceiver module 32, respectively. Each of the processing modules 14 and 34 comprises one or more processors, e.g. one or more microprocessors, microcontrollers, multi-core processors, or the like. More generally, the processing module 14 (respectively 34) may comprise fixed circuitry or programmable circuitry that is specifically configured via the execution of program instructions implementing the functionality taught therein, or may comprise combinations of fixed and programmable circuitry. Each of the processing modules 14 and 34 also include and are connected to a respective memory module 16 and 36, respectively. The memory module 16 (and respectively 36), in some embodiments, store one or more computer programs and, optionally, configuration data. The memory module provides non-transitory storage for the computer program and it may comprise one or more types of computer-readable media, such as disk storage, solid-state memory storage, or any combination thereof. By way of non-limiting example, the memory module may comprise any one or more of SRAM, DRAM, EEPROM, and FLASH memory, which may be in the processing module 14 (respectively 34) and/or separate from the processing module, in general, the memory module comprises one or more types of computer-readable storage media providing non-transitory storage of the computer program and any configuration data used by the terminal device/network node. Here, "non-transitory" means permanent, semi-permanent, or at least temporarily persistent storage and encompasses both long-term storage in non-volatile memory and storage in working memory, e.g., for program execution.

In some embodiments, the methods illustrated in FIGS. 3 and 5 further include that the DI, determined at the base station 30, may also be received at the terminal device 10 in a DCI message, for example on the dPDCH, whereby the DCI message may also comprise a resource assignment of the rPDCH, i.e. an assignment as to which frequency and time resources, which OFDM symbols, etc. are configured for the rPDCH. As such, the DCI message may be send on dPDCH but may also be sent on PDCCH. In the latter case, the DI received in a DCI message on PDDCH may also indicate that resources not used for the DCI of the configured for PDCCH may be used for rPDCH.

Further, the DI may be changed when the terminal device 10 is scheduled to receive the dPDCH. Furthermore, the DI may be changed every time terminal device 10 is scheduled to receive the dPDCH. Alternatively, the DI may be included in a dedicated message received by the terminal device 10, whereby the dedicated message is a dedicated message to the terminal device. When comparing these two embodiments, it is apparent that the DI may be changed on a slower basis in the dedicated message case as compared to the case when the DI is changed in time with a scheduling event. In a further embodiment, the base station 30 may appropriately switch between the scheduling case and the dedicated message case for transmitting the DI to the terminal device 10, in order to switch between faster and slower dynamic demodulation scenarios.

In a further embodiment, the DI may be valid only for a current transmission time interval (TTI), i.e. two adjacent subframes. As such, the base station 30 provides a valid DI when the terminal device 10 is scheduled to receive the dPDCH. The DI is preferably comprised in the DCI, e.g. received on dPDCH.

In a further embodiment, obtaining the DI at the terminal device may be based on at least one of a capability of the terminal device 10, a subframe number, and an antenna configuration on the base station side, for example having many versus fewer antennas. For example the UE may receive a DI subframe configuration, and the DI may have different values for different terminal devices. Further, if the number of antennas is lower than a threshold, DI may have a first interpretation (e.g., a large power offset when first physical channel using configured resource for second physical channel), and a second interpretation when the number of antennas is larger than the threshold (e.g., a smaller power offset when first physical channel using configured resource for second physical channel).

In a further embodiment the DI, for example included in a DCI message transmitted on dPDCH, may be a one-bit indicator for indicating whether or not PDCCH is present. Here, if the indicator is "true" the rPDCH would be rate-matched around PDCCH (resources). Otherwise, if the indicator is "false" (PDCCH not present), the rPDCH is utilizing the resources where the PDCCH may be located. Such a one-bit (binary) DI thus includes a first value and a second value. The first value (DI=0) indicates that the first physical channel (rPDCH) is to be demodulated by rate-matching around configured and used resources of the second physical channel (PDCCH). The second value (DI=1) indicates that the first physical channel (rPDCH) is to be demodulated by using configured and unused resources of the second physical channel (PDCCH). In other words, since the second physical channel (PDCCH) is not present, as configured resources are not used, there is no need to perform a rate-matching around the PDCCH.

In this embodiment the DCI may comprise a binary DI indicating whether rPDCH is rate-matched around PDCCH or not, i.e. the rPDCH demodulation indicator provides an indication according to the Table 1 below:

TABLE 1

Meaning of rPDCH DI.

| DI | Meaning |
|---|---|
| 0 | rPDCH shall be demodulated by rate-matching around PDCCH resources |
| 1 | rPDCH shall be demodulated by using configured PDCCH resources |

Figure 1:
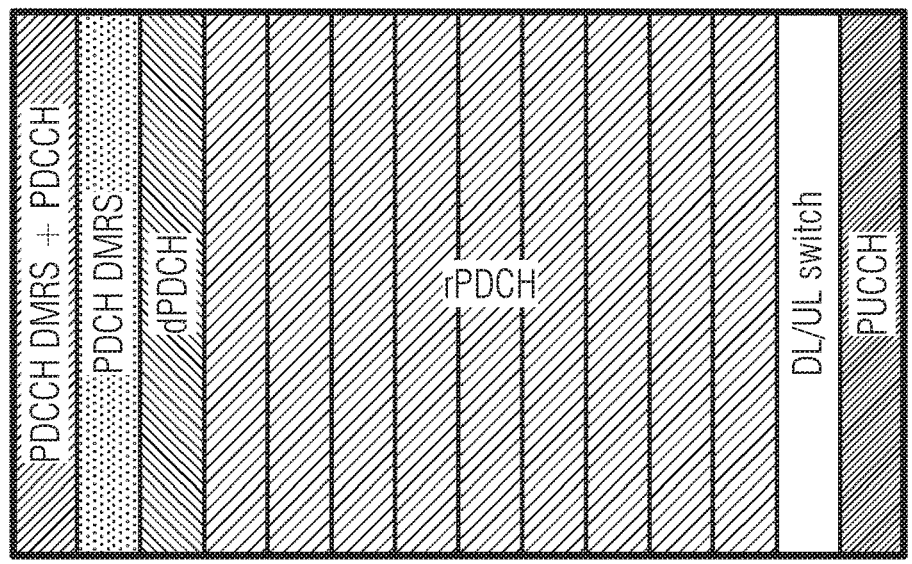
FIG. 1 is a schematic diagram of a TDD frame structure for NX illustrating the mapping of respective channels, DMRSs, and a DL/UL switch guard period.
Figure 2:
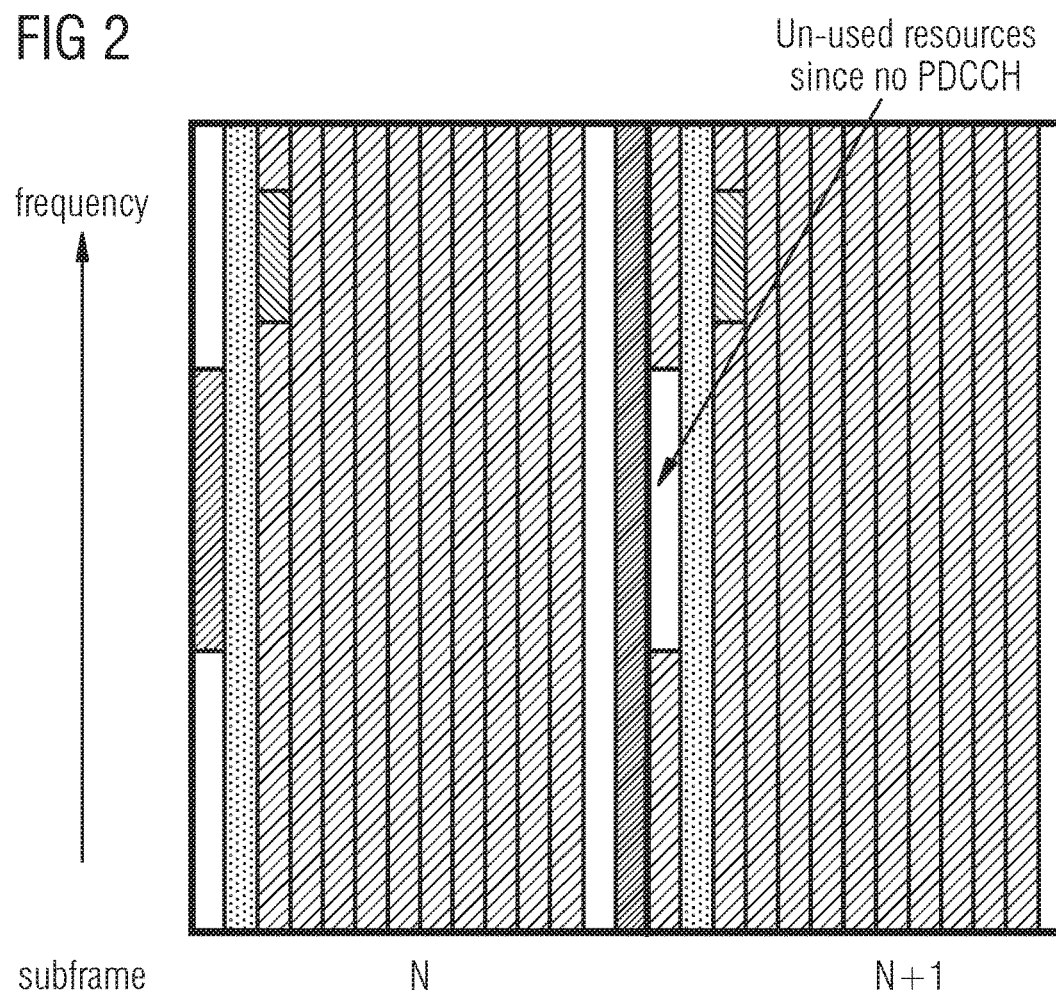
FIG. 2 is a schematic diagram of two subframes where rPDCH is rate-matched around PDCCH in the Subframe N, while PDCCH is not present in the Subframe N+1.

The rPDCH demodulation indicator may thus dynamically instruct the terminal device (UE) 10 whether it should assume rPDCH PDCCH resources or not. This means that when no DCIs are sent on PDCCH, i.e. all DCIs are sent in-band, the PDCCH resources may be used for rPDCH transmission which will increase the throughput. In other words, the DI is sent over dPDCH to indicate whether or not the resources of PDCCH should be used or not for the rPDCH. In a scenario, the terminal device 10 may buffer a whole sub-frame. Then it decodes dPDCH in the third symbol by using the DMRS in the second symbol of the subframe. From decoding the dPDCH the terminal device 10 obtains the DI and knows if and how it should assume (or not assume) rPDCH in the location where PDCCH is configured. According to FIG. 4 a subframe N where the demodulation indicator is DI=0 is sent on the third symbol (being related to dPDCH) and indicates that demodulation of rPDCH shall be demodulated by rate-matching the rPDCH around PDCCH resources (shaded region in first TDD symbol). In subframe N+1 the demodulation indicator is DI=1 and thus indicates that such rate-matching shall not be performed in the demodulation and the rPDCH may be demodulated using all or a part (a sub-set) of the configured PDCCH resources. In other words, FIG. 4 illustrates that it is now possible to dynamically indicate if the resources of PDCCH should be used or not. This is in contrast to FIG. 2 which illustrates that without this dynamic indication only a fixed (i.e. static) rule to never (or always) use the resources of PDCCH is applied.

In another embodiment the DI may further indicate a transmission power level to be used for the first physical channel (rPDCH), in particular when the rPDCH is mapped onto configured and used/unused PDCCH resources. This enables a scenario in which the rPDCH may be mapped onto PDCCH physical resources although the PDCCH is present. This means that the PDCCH and the rPDCH may be transmitted at the same time and the same frequency, provided that the PDCCH does not use the entire power budget. In such an embodiment the part of rPDCH mapped onto the PDCCH physical resource would be transmitted with a lower power, e.g., the remaining power not used by PDCCH. The DI may, in this scenario, indicate a power offset for the rPDCH part mapped onto PDCCH resource. The offset may, for example, be relative to the PDCH DMRS power (as used in the second symbol, as explained above). A small number of power-offset values e.g. represented by one bit (high, low) or a small number of bits (e.g. 2 bits indicating 0, −3, −6, −9 dB respectively) may be part of said indicator. The power offset values may also be configured e.g. by higher layers.

In such an embodiment, the dynamic DI may further indicate a demodulation of rPDCH using a specific (e.g., lower) power in the PDCCH resource. This may be achieved by a DI being a two-bit indicator having four values. Here, the first value of the two-bit indicator indicates that the first physical channel (rPDCH) is to be demodulated by rate-matching around configured and used resources of the second physical channel (PDCCH), i.e. in a situation in which the PDCCH is present. The second, third, and fourth value of the two-bit indicator indicates that the first physical channel (rPDCH) is to be demodulated by using configured resources of the second physical channel (PDCCH) and indicates respective first, second, and third non-zero power levels to be used for the rPDCH.

More specifically, such an embodiment may use a DI that is extended to a two-bit indicator according to Table 2 below:

TABLE 2

Meaning of rPDCH DI

| DI | Meaning |
|---|---|
| 0 | rPDCH shall be demodulated by rate-matching around PDCCH resources |
| 1 | rPDCH shall be demodulated by using configured PDCCH resources. Full power assumed |
| 2 | rPDCH shall be demodulated by using configured PDCCH resources. Power offset $\Delta_1$ on rPDCH in PDCCH resource |
| 3 | rPDCH shall be demodulated by using configured PDCCH resources. Power offset $\Delta_2$ on rPDCH in PDCCH resource |

This embodiment enables that rPDCH may use PDCCH resources although PDCCH is present, if a power budget permits that. When DCIs are assigned on PDCCH the scheduler may do robust PDCCH link adaptation so that PDCCH does not utilize full power which makes it possible to let rPDCH utilize use the remaining power. This means that rPDCH will typically need to be transmitted with a lower power in the resource overlapping the PDCCH. To perform a proper demodulation of the rPDCH in the PDCCH-part this lower power need to be indicated to the terminal device (UE). According to the two-bit DI as illustrated in Table 2 it is possible to indicate three power non-zero power levels for rPDCH within PDCCH resource, full transmission power level (i.e. the PDCCH is not present and configured PDCCH resources are not used for the PDCCH), power offset $\Delta_1$ or power offset $\Delta_2$ (being smaller than $\Delta_1$). In the cases of using power offset values $\Delta_i$ (i=1, 2) the PDCCH is present and configured PDCCH resources are used for the PDCCH. In addition, the rPDCH uses the remaining power (as indicated by the offset value) that is not used by the PDCCH.

In a further preferred embodiment, the power offset may be defined relative to a predefined power such as relative to the PDCH DMRS power. The power offset values $\Delta_i$ may also be predefined fixed values not changing with time, for example specified by standard. The power offset values may also be configured to the terminal device (UE) 10. This configuration may either be a common configuration, e.g., signaled via a system information broadcast/multicast, or a terminal device specific configuration, for example by using a dedicated signaling using e.g. the Radio Resource Configuration Protocol or the like.

Figure 7:
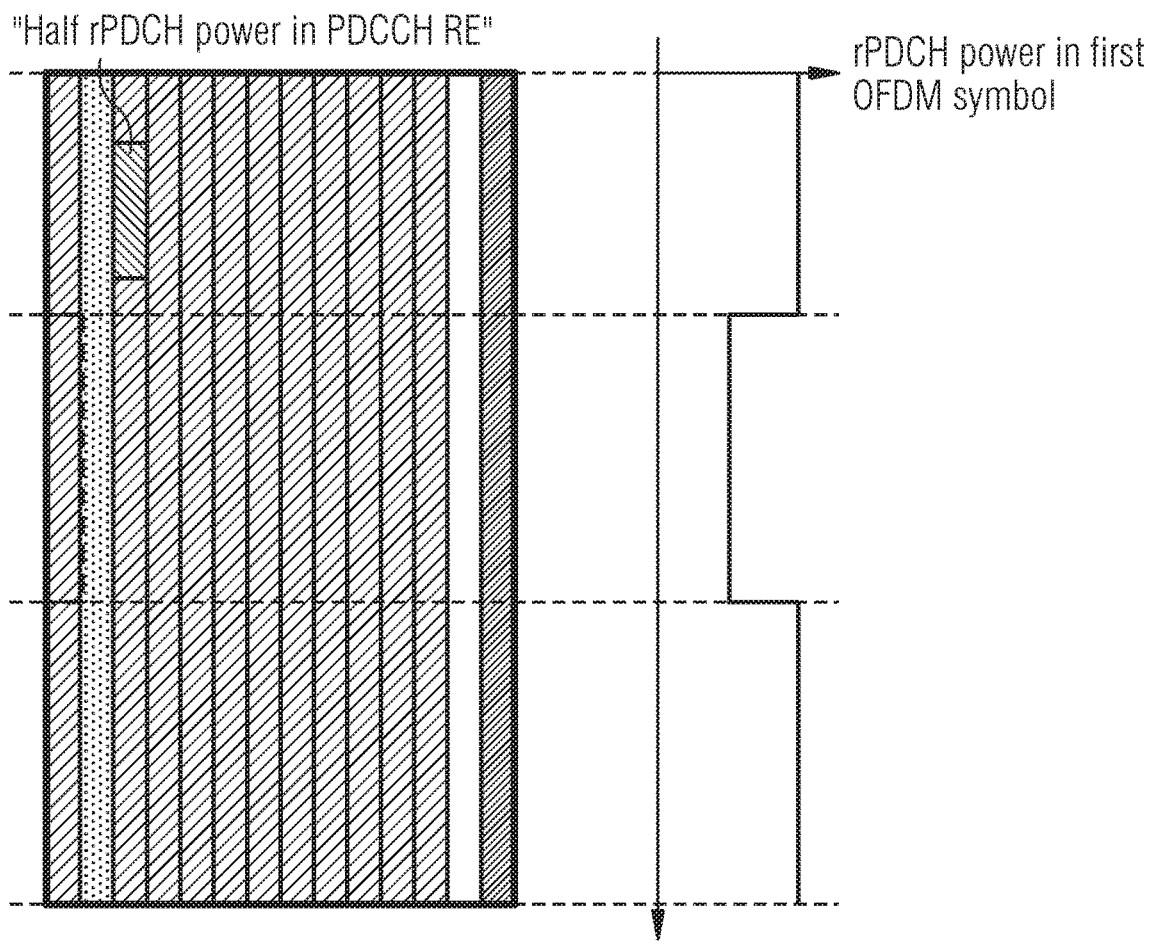
FIG. 7 is a schematic diagram illustrating an embodiment according to a subframe where the demodulation indicator indicates that demodulation shall be performed assuming half the transmission power.

The above embodiment if further illustrated in FIG. 7 which schematically illustrates a scenario where the DI indicates that rPDCH is transmitted with half transmission power in the configured and used PDCCH resources compared to other resources.

More specifically, FIG. 7 illustrates a subframe N for which the DI, "Half rPDCH power in PDCCH Resource Element (RE)", indicates that demodulation of rPDCH shall be performed by assuming half the transmission power for the rPDCH mapped onto the PDCCH resources (dotted box in symbol 1 of the Subframe). As further indicated by the transmission power diagram on the right side of FIG. 7, the transmission power for the rPDCH around the used PDCCH resources may be unchanged and assume full transmission power.

Figure 8:
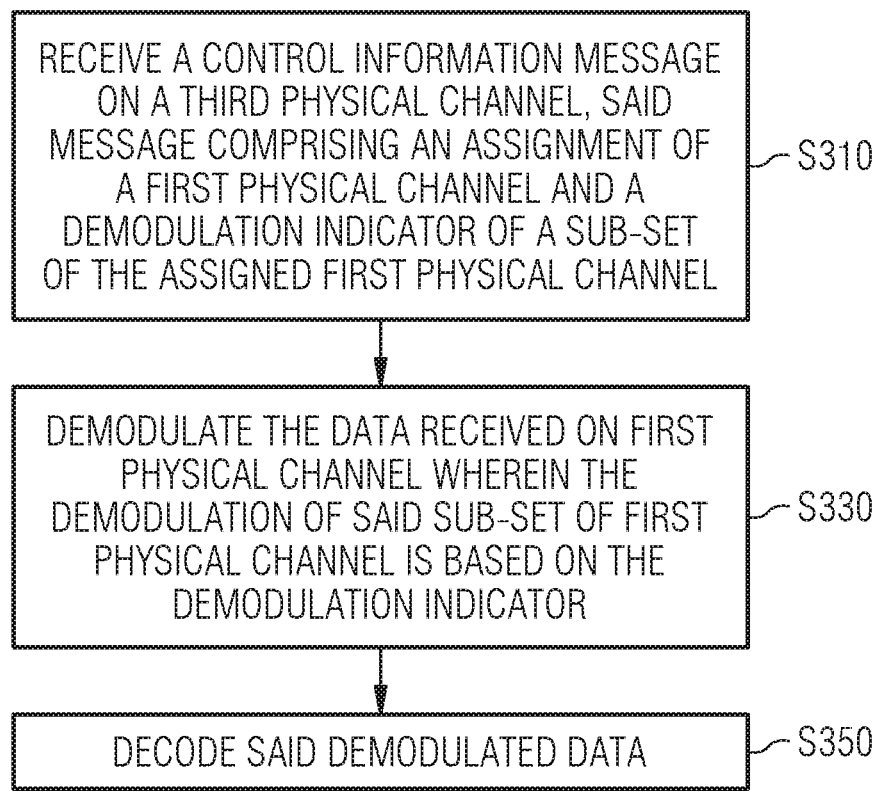
FIG. 8 is a schematic flow diagram illustrating an embodiment of a method for applying dynamic demodulation.

FIG. 8 shows a flowchart of a further embodiment of a method used at a terminal device (UE) 10. In a first step S310 the terminal device (UE) 10 receives, via the radio transceiver module 12, a control information message (e.g., DCI) on a third physical channel (e.g., dPDCH). The control message comprises an assignment of a first physical channel (e.g., rPDCH) and a demodulation indicator DI indicating how to demodulate a sub-set (e.g., the PDCCH-part, the PDCCH being a second physical channel) of the first physical channel, in the next step S330 the terminal device (UE) 10 uses the processing module 14 to demodulates data received based on the DI, which may, for example, be to rate-match the first physical channel (e.g., rPDCH) around a sub-set of physical resources of the second physical channel. In the last step S350 according to FIG. 8 the terminal device (UE) 10 then uses the processing module 14 to decode the demodulated data.

According to a further preferred embodiment, the terminal device 10 may be configured to determine time and/or frequency resources of the third physical channel (dPDCH) based on a received demodulation reference signal (DMRS). As explained above, the terminal device 10 may use a memory to buffer a whole sub-frame. Then, the terminal device 10 decodes dPDCH, for example in the third symbol of the subframe, by using the DMRS in the, for example, second symbol of the subframe. From decoding the dPDCH the terminal device 10 obtains the DI and knows if and how it should assume (or not assume) rPDCH in the location where PDCCH is configured. As such, the finding of the third physical channel (dPDCH) in a resource search space is supported by the DMRS based on which corresponding resources may be identified. In other words, the DMRS is for demodulating each position in the search space for dPDCH.

According to a further embodiment, the DMRS is provided at a fixed position in the subframe, preferably at a fixed position with regard to the dPDCH, for example adjacent to or even in the same ODFM symbol. Such an optimized DMRS and demodulation procedure is further illustrated in FIG. 9 which shows that both the DMRS and the dPDCH are provided in a fixed position (in subsequent subframes), and thus also a fixed relation between the DMRS and the dPDCH is maintained. Accordingly, the procedure for the terminal device (UE) 10 to find and decode dPDCH may be improved because the detection of dPDCH is not affected by the existence of PDCCH. This may be facilitated by having a fixed position of the DMRS for demodulating each position in the search space for dPDCH. As indicated above, this may be achieved in a number of ways, as will be further described below.

Figure 9:
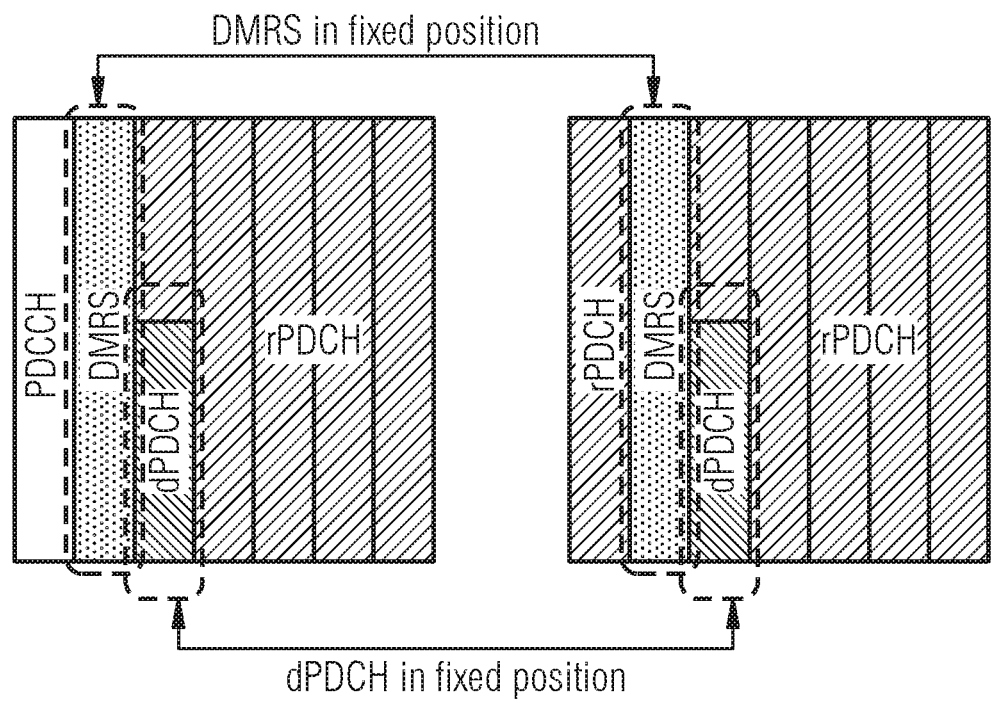
FIG. 9 is a schematic diagram illustrating an embodiment according to the provision of fixed positions for DMRS and dPDCH.

According to the embodiment in FIG. 9 which illustrates that the dPDCH search space is unaffected by PDCCH rate matching, a sub-frame mapping of DMRS and dPDCH may be used that is non-intersecting with the positions of PDCCH. It is noted that some embodiments the DMRS may also be intersecting with the PDCCH OFDM-symbol. The example solution is to use a set of OFDM symbols $\{0, \ldots, k\}$ for PDCCH, for simplicity in the description we assume that it is only OFDM symbol 0 although it is likely that OFDM symbol 1 could be needed also in some scenarios. Further we will then use $\{k+1, \ldots, k+2\}$ for DMRS and again assume that only OFDM symbol 1 is used for simplicity in the example description. Further, dPDCH may be placed adjacent to the DMRS, which is schematically depicted in FIG. 9. Such a mapping realizes the concept to place dPDCH early in order to provide faster decoding, hence possibly even in the same OFDM symbol as the DMRS.

Figure 10:
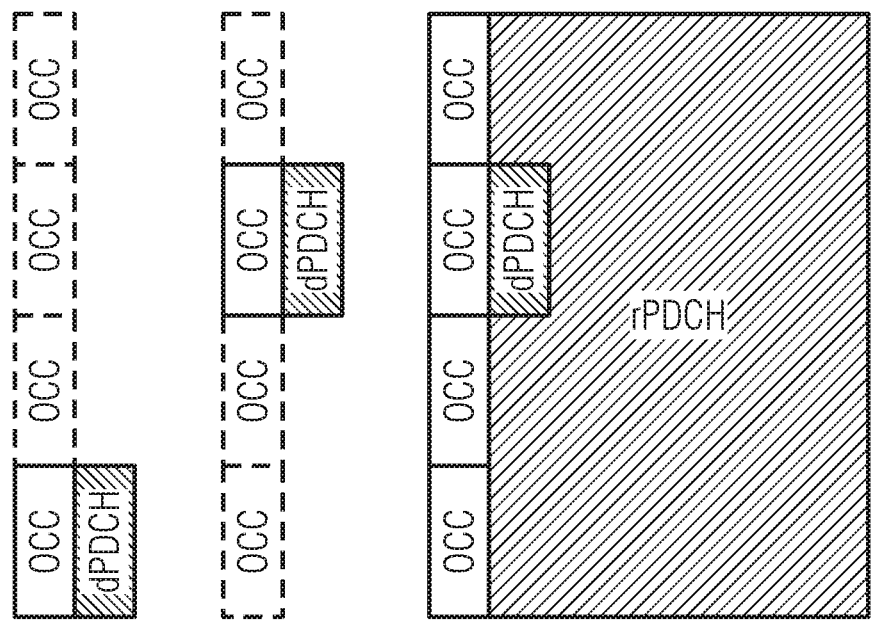
FIG. 10 is a schematic diagram illustrating an embodiment according to using DMRS partial sequences (OCCs) for dPDCH decoding.

According to a further embodiment, as illustrated in FIG. 10 which schematically shows DMRS partial sequences (OCCs) for dPDCH decoding, the search space of the third physical channel (dPDCH) may include multiple individually decodable positions and the demodulation reference signal (DMRS) uses partial sequences, e.g. orthogonal cover codes (OCC), of limited length. Hence the procedure for searching for dPDCH should not be coupled with the allocation bandwidth of PDCH (i.e. including rPDCH). This can be achieved by using OCCs of limited length that are in the search space of the wireless terminal device 10, as depicted in FIG. 10, were three different alternatives are illustrated with regard to an example with 4 OCC, and 2 of said OCC are used for dPDCH search space. After decoding dPDCH the terminal device 10 may use all the DMRS elements (i.e. all OCC in this example) for rPDCH demodulation and decoding. It is noted that the OCC may be shorter or longer than the dPDCH resource, there can be partial overlap for some OCCs, that a number of OCC may be used for a single dPDCH etc., i.e. the picture is only for illustration purposes. The sequence used for the OCCs may further be of many different types, for the purpose of this refined embodiment the important feature is that extraction of partial sequences can be done thus making the decoding of dPDCH quicker. Hence in some embodiments the cover codes are not orthogonal cover codes but some other type of sequences that are also possible to use (e.g. not fully orthogonal sequences).

The above respective modules may be implemented by a processing unit that include one or a plurality of processors, a microprocessor or other processing logic that interprets and executes instructions stored in a main memory, i.e. memory module 16 and 36. The main memory may include a RAM or other type of dynamic storage device that may store information and instructions for execution by the respective modules/units. For example, the radio transceiver module 12 and 32 and the processing module 14 and 34 discussed above with respect to FIG. 6 may be realized by the processing unit/processor. The ROM may include a ROM device or another type of static storage device that may store static information and instructions for use by the processing unit.

As mentioned above, the base station (network node) 30 as well as the terminal device 10 may perform certain operations or processes (acquiring, identifying, transmitting, predicting, decision making, etc.) described herein. The base station (network node) 30 and the terminal device 10 may perform these operations in response to the processing unit/processor executing software instructions contained in a computer-readable medium, such as the main memory, ROM and/or storage device. A computer-readable medium may be defined as a physical or a logical memory device. For example, a logical memory device may include memories within a single physical memory device or distributed across multiple physical memory devices. Each of the main memory, ROM and storage device may include computer-readable media with instructions as program code. The software instructions may be read into the main memory for another computer-readable medium, such as a storage device or from another device via the communication interface.

Further, the software instructions contained in the main memory may cause the processing unit(s) including a data processor, when executed on the processing unit, to cause the data processor to perform operations or processes described herein. Alternatively, hard-wired circuitry may be used in place or on in combination with the software instructions to implement processes and/or operations described herein. Thus, implementations described herein are not limited to any specific combination of hardware and software.

The physical entities according to the different embodiments of the invention, including the elements, units, modules, nodes and systems may comprise or store computer programs including software instructions such that, when the computer programs are executed on the physical entities, steps and operations according to the embodiments of the invention are carried out, i.e. cause data processing means to carry out the operations. In particular, embodiments of the invention also relate to computer programs for carrying out the operations/steps according to the embodiments of the invention, and to any computer-readable medium storing the computer programs for carrying out the above-mentioned methods.

Where the term module is used, no restrictions are made regarding how distributed these elements may be and regarding how gathered these elements may be. That is, the constituent elements/modules/units of the base station (network node) 30 as well as the terminal device 10 may be distributed in different software and hardware components or other devices for bringing about the intended function. A plurality of distinct elements/modules may also be gathered for providing the intended functionality. For example, the elements/modules/functions of the UE/nodes may be realized by a microprocessor and a memory similar to the above node including a bus, a processing unit, a main memory, ROM, etc. The microprocessor may be programmed such that the above-mentioned operations, which may be stored as instructions in the memory, are carried out.

Further, the elements/modules/units of the apparatus may be implemented in hardware, software, Field Programmable Gate Arrays (FPGAs), application-specific integrated circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

Abbreviations

3GPP Third Generation Partnership Project
CRS Cell Specific Reference Signals
CSI Channel-State Information
CSI-IM CSI Interference Measurement
CSI-RS CSI Reference Symbol
DCI Downlink Control Information
DMRS Demodulation Reference Signal
eNB Enhanced NodeB
HARQ Hybrid Automatic Repeat-reQuest
LTE Long Term Evolution
MAC Medium Access Control
MCS Modulation and Coding Scheme
MI Mutual Information
MIMO Multiple Input Multiple Output
MTC Machine-Type Communication Device
OFDM Orthogonal Frequency-Division Multiplexing
OCC Orthogonal Cover Code
PCFICH Physical Control Format Indicator Channel
PDSCH Physical Downlink Shared Channel
(e)PDCCH (enhanced) Physical Downlink Control Channel
RRC Radio Resource Control
TDD Time-Division Duplex
TTI Transmission Time Interval
UE User Equipment

The invention claimed is:

1. A method for applying demodulation for a first physical channel of a radio access of a terminal device to a base station of a wireless communication network, the method comprising:
obtaining a demodulation indicator (DI) at the terminal device, the DI indicating a usage of configured resources of a second physical channel for demodulating at least part of the first physical channel, wherein the DI is a one-bit indicator;
wherein a first value of the one-bit indicator indicates that the first physical channel is to be demodulated by rate-matching around configured and used resources of the second physical channel; and
wherein a second value of the one-bit indicator indicates that the first physical channel is to be demodulated by using configured and unused resources of the second physical channel; and
demodulating, at the terminal device, data received on the first physical channel based on the obtained DI.

2. The method of claim 1, wherein the DI is received at the terminal device on a third physical channel.

3. The method of claim 1, wherein the DI is received at the terminal device in a downlink control information (DCI) message, the DCI message further comprising a resource assignment of the first physical channel.

4. The method of claim 2, wherein a value of the DI is changed when the terminal device is scheduled to receive the third physical channel.

5. The method of claim 1, wherein the DI is included in a dedicated message received by the terminal device, the dedicated message being a dedicated message to the terminal device.

6. The method of claim 1, wherein the DI is valid only for a current transmission time interval.

7. The method of claim 1, wherein the obtaining of the DI is based on at least one of:
a capability of the terminal device capability;
a subframe number; and
an antenna configuration on the base station side.

8. The method of claim 1, wherein the DI is for indicating whether or not the second physical channel is present.

9. The method of claim 8, wherein the DI is further for indicating a power level used for the first physical channel.

10. The method of claim 9:
wherein the DI is a two-bit indicator;
wherein a first value of the two-bit indicator indicates that the first physical channel is to be demodulated by rate-matching around configured and used resources of the second physical channel; and
wherein a second, a third, and a fourth value of the two-bit indicator indicates that the first physical channel is to be demodulated by using configured resources of the second physical channel, and indicates respective first, second, and third non-zero power levels.

11. The method of claim 10, wherein:
the second value of the two-bit indicator indicates that the first physical channel is to be demodulated by using configured and unused resources of the second physical channel and the first physical channel is transmitted by assuming full transmission power;
the third value of the two-bit indicator indicates that the first physical channel is to be demodulated by using configured and used resources of the second physical channel and the first physical channel is transmitted by assuming a first power offset with regard to the full transmission power;
the fourth value of the two-bit indicator indicates that the first physical channel is to be demodulated by using configured and used resources of the second physical channel and the first physical channel is transmitted by assuming a second power offset with regard to the full transmission power.

12. The method of claim 11, wherein the power offset values are relative values to a predefined power.

13. The method of claim 11, wherein the power offset values are fixed values.

14. The method of claim 11, wherein the power offset values are configured for the terminal device by using a common configuration or a terminal device specific configuration.

15. The method of claim 2, further comprising determining, at the terminal device, time and/or frequency resources of the third physical channel based on a received demodulation reference signal.

16. The method of claim 15, wherein the demodulation reference signal is provided at a fixed position.

17. The method of claim 16, wherein the third physical channel includes multiple individually decodable positions and the demodulation reference signal uses partial sequences of limited length.

18. The method of claim 2:
wherein the first physical channel is a physical data channel for transmitting re-transmittable data;
wherein the second physical channel is a physical downlink control channel; and
wherein the third physical channel is a physical data channel for transmitting non-re-transmittable data.

19. A method for providing a demodulation indication for a first physical channel of a radio access of a terminal device to a base station of a wireless communication network, the method comprising:
determining a demodulation indicator (DI) at the base station, the DI indicating a usage of configured resources of a second physical channel for demodulating at least part of the first physical channel,
wherein the DI is a one-bit indicator;
wherein a first value of the one-bit indicator indicates that the first physical channel is to be demodulated by rate-matching around configured and used resources of the second physical channel; and
wherein a second value of the one-bit indicator indicates that the first physical channel is to be demodulated by using configured and unused resources of the second physical channel; and
transmitting the determined DI to the terminal device.

20. The method of claim 19, wherein the DI is transmitted on a third physical channel.

21. The method of claim 20, wherein the DI is changed, by the base station, when the terminal device is scheduled to receive the third physical channel.

22. The method of claim 19, wherein the base station includes the DI in a dedicated message, the dedicated message being a dedicated message to the terminal device.

23. The method of claim 20, wherein the base station further switches between changing the DI when the terminal device is scheduled to receive the third physical channel and including the DI in a dedicated message.

24. The method of claim 19, wherein the DI is for indicating a power level used by the first physical channel.

25. The method of claim 24, wherein the DI is further for indicating a power level used for the first physical channel.

26. A terminal device for applying demodulation for a first physical channel of a radio access of the terminal device to a base station of a wireless communication network, the terminal device comprising:
processing circuitry;
memory containing instructions executable by the processing circuitry whereby the terminal device is operative to:

obtain a demodulation indicator (DI), the DI indicating a usage of configured resources of a second physical channel for demodulating at least part of the first physical channel, wherein the DI is a one-bit indicator;

wherein a first value of the one-bit indicator indicates that the first physical channel is to be demodulated by rate-matching around configured and used resources of the second physical channel; and wherein a second value of the one-bit indicator indicates that the first physical channel is to be demodulated by using configured and unused resources of the second physical channel; and demodulate data received on the first physical channel based on the obtained DI.

27. A base station of a wireless communication network for providing a demodulation indication for a first physical channel of a radio access of a terminal device to the base station, the base station comprising:

processing circuitry;

memory containing instructions executable by the processing circuitry whereby the base station is operative to:

determine a demodulation indicator (DI), the DI indicating a usage of configured resources of a second physical channel for demodulating at least part of the first physical channel, wherein the DI is a one-bit indicator;

wherein a first value of the one-bit indicator indicates that the first physical channel is to be demodulated by rate-matching around configured and used resources of the second physical channel; and wherein a second value of the one-bit indicator indicates that the first physical channel is to be demodulated by using configured and unused resources of the second physical channel; and transmit the determined DI to the terminal device.

28. A wireless communication system, comprising a base station for providing a demodulation indication for a first physical channel of a radio access of a terminal device to the base station, the base station comprising:

first processing circuitry;

first memory containing instructions executable by the first processing circuitry whereby the base station is operative to:

determine a demodulation indicator (DI), the DI indicating a usage of configured resources of a second physical channel for demodulating at least part of the first physical channel, wherein the DI is a one-bit indicator;

wherein a first value of the one-bit indicator indicates that the first physical channel is to be demodulated by rate-matching around configured and used resources of the second physical channel; and wherein a second value of the one-bit indicator indicates that the first physical channel is to be demodulated by using configured and unused resources of the second physical channel; and transmit the determined DI to the terminal device;

the terminal device comprising:

second processing circuitry;

second memory containing instructions executable by the second processing circuitry whereby the terminal device is operative to:

obtain the DI from the base station; and demodulate data received on the first physical channel based on the obtained DI.

29. A non-transitory computer readable recording medium storing a computer program product for applying demodulation for a first physical channel of a radio access of a terminal device to a base station of a wireless communication network, the computer program product comprising software instructions which, when run on processing circuitry of the terminal device, causes the terminal device to:

obtain a demodulation indicator (DI), the DI indicating a usage of configured resources of a second physical channel for demodulating at least part of the first physical channel, wherein the DI is a one-bit indicator;

wherein a first value of the one-bit indicator indicates that the first physical channel is to be demodulated by rate-matching around configured and used resources of the second physical channel; and wherein a second value of the one-bit indicator indicates that the first physical channel is to be demodulated by using configured and unused resources of the second physical channel; and demodulate data received on the first physical channel based on the obtained DI.

30. A non-transitory computer readable recording medium storing a computer program product for providing a demodulation indication for a first physical channel of a radio access of a terminal device to a base station of a wireless communication network, the computer program product comprising software instructions which, when run on processing circuitry of the base station, causes the base station to:

determine a demodulation indicator (DI), the DI indicating a usage of configured resources of a second physical channel for demodulating at least part of the first physical channel, wherein the DI is a one-bit indicator;

wherein a first value of the one-bit indicator indicates that the first physical channel is to be demodulated by rate-matching around configured and used resources of the second physical channel; and wherein a second value of the one-bit indicator indicates that the first physical channel is to be demodulated by using configured and unused resources of the second physical channel; and transmit the determined DI to the terminal device.

* * * * *